(12) United States Patent
Palmer

(10) Patent No.: US 12,441,205 B2
(45) Date of Patent: Oct. 14, 2025

(54) PRECAST BLOCK FOR HOUSING AND ROUTING ELECTRICAL POWER CABLES, AN ELECTRIC VEHICLE CHARGING STATION USING THE BLOCK AND A MANUFACTURING METHOD

(71) Applicant: EV Blocks LTD, Peterborough (GB)

(72) Inventor: Trevor Palmer, Peterbourgh (GB)

(73) Assignee: EV Blocks LTD, Peterborough (GB)

( * ) Notice: Subject to any disclaimer, the term of this patent is extended or adjusted under 35 U.S.C. 154(b) by 855 days.

(21) Appl. No.: 17/616,902

(22) PCT Filed: Jun. 8, 2020

(86) PCT No.: PCT/GB2020/051385
§ 371 (c)(1),
(2) Date: Dec. 6, 2021

(87) PCT Pub. No.: WO2020/245613
PCT Pub. Date: Dec. 10, 2020

(65) Prior Publication Data
US 2022/0234460 A1    Jul. 28, 2022

(30) Foreign Application Priority Data

Jun. 6, 2019 (GB) ...................................... 1908059
Jan. 10, 2020 (GB) ...................................... 2000372

(51) Int. Cl.
*H02G 3/22* (2006.01)
*B60L 53/31* (2019.01)

(52) U.S. Cl.
CPC ................ *B60L 53/31* (2019.02); *H02G 3/22* (2013.01)

(58) Field of Classification Search
None
See application file for complete search history.

(56) References Cited

U.S. PATENT DOCUMENTS 3,870,347 A * 3/1975 Haubenestel ........ H02G 3/0616
285/154.1
3,873,134 A * 3/1975 Sammaritano .......... F16L 39/00
285/334.3
6,232,553 B1 * 5/2001 Regen .................... H02G 3/083
174/64

(Continued)

FOREIGN PATENT DOCUMENTS

DE    202013006311 U1    8/2013
DE    102016121629 A1    5/2018
WO    WO-2016011735 A1 *  1/2016 ............... E04B 2/50

OTHER PUBLICATIONS

International Search Report for corresponding PCT Application No. PCT/GB2020/051385 mailed Jul. 10, 2020.

*Primary Examiner* — Krystal Robinson
(74) *Attorney, Agent, or Firm* — Wood, Phillips, Katz, Clark & Mortimer

(57) ABSTRACT

A preformed block is used for housing and routing electrical power cables, and comprises a central cavity. At least two adjacent faces of the block have an opening which connects to the central cavity. Electrical power cables can thus be routed within the block between those openings, from a side face (leading to a trench) to the top face (leading to an electrical installation on top). There is also provided an electric vehicle charging station using the precast block and a method of casting a block.

58 Claims, 4 Drawing Sheets

(56) References Cited

U.S. PATENT DOCUMENTS

| | | | | |
|---|---|---|---|---|
| 6,930,246 B1 * | 8/2005 | Blundo | ................ | H02G 3/083 |
| | | | | 174/64 |
| 7,546,019 B1 * | 6/2009 | Belcher | ................ | H02G 3/185 |
| | | | | 385/136 |
| 2013/0309022 A1 * | 11/2013 | Hokfelt | ................ | H02G 9/10 |
| | | | | 405/229 |

* cited by examiner

PRECAST BLOCK FOR HOUSING AND ROUTING ELECTRICAL POWER CABLES, AN ELECTRIC VEHICLE CHARGING STATION USING THE BLOCK AND A MANUFACTURING METHOD

FIELD OF THE INVENTION

The invention relates to the field of preformed blocks for housing and routing cables. In particular, the invention relates to preformed blocks that provide an easier and more reliable means for routing underground electrical power cables into an above ground electrical installation, such as an electric vehicle charging unit.

BACKGROUND OF THE INVENTION

Many above ground electrical installations are supplied with power from cables, which are laid in trenches underground. The underground cable rises above ground level at the base of the electrical installation, which may for example be an electric vehicle charging station.

Typically, the cables are placed in plastic cable duct in a trench dug into the ground. The plastic cable duct is bent such that when wet concrete is poured into the trench and allowed to dry, the wires are appropriately routed to the surface through the cable duct, allowing the electric installation to be installed on top. Maintenance or inspection of the cables thereafter is difficult to undertake without damaging the base.

A strong, solid material, such as concrete, is required at the base to support the weight of the electrical installation. However, wet concrete can only be applied in favourable weather conditions (including where the temperature is above 3° C.). Furthermore, the electrical installation cannot be installed until the concrete base has cured. Concrete typically takes 24-48 hours to cure, to the point of being able to walk on, and is considered fully cured 28 days later. It is also not possible to control the quality of the final concrete mass, which might contain cracks or imperfections.

Owing to the shuttering for each base being hand made on site, the size can vary from base to base. The finish of each base is variable depending on the skill of the operative carrying out the final "floating off" of the base.

It has been proposed to use preformed blocks to form the base of an electrical installation such as an electric vehicle charging station. The known proposal makes use of a Concrete Masonry Unit, CMU, as a base. These CMU is in the form of a block with a regular geometry, such as a cuboid, with a hole through the middle, running from top to bottom.

By forming the block over a trench, underground cables can enter the block from below and be directed through the vertical hole to the surface, enabling the electrical installation to be installed on top of the block. This requires a trench beneath the block so that the underground cable can enter beneath the block. This not only disturbs the stability and level of the ground on which the block will eventually be placed, it also means that the cable must be fed through the block before the block is laid in its final position. This can result in a suboptimal base for the electrical installation and requires installation by more specialized installers. The use of standard CMUs also limits where the electrical installation can be placed because it requires the trench to be deeper than the block, which can be problematic if the electrical installation is to be installed in a built up area where existing cables and piping reside, such as an urban area or vehicle refueling station.

Therefore, there remains a need for a preformed block that can be used to house and route underground cables to an electrical installation whilst providing a solid, easily accessible base for the electrical installation.

The electrical installation is typically securely attached to the base on which it sits. This is for example achieved by drilling holes and embedding fastenings into the concrete of the base, for example, on the exposed face of the base. The fastening arrangement for example has a pattern of bolts, which depends on the design of the electrical installation, so that it matches a physical connection interface of the electrical installation. This can reduce the integrity of the concrete. It also requires expert installation. Furthermore, once the fastening arrangement has been embedded in the concrete, it is not possible to change the configuration of the fastening arrangement.

Therefore, there also remains a need for a preformed block that can be used to house and route underground cables to an electrical installation and that does not require drilling into the concrete block to provide a fastening arrangement, and where the fastening arrangement can be changed at a later date if required.

SUMMARY OF THE INVENTION

According to examples in accordance with an aspect of the invention, there is provided a preformed block for housing and routing electrical power cables, comprising: a central cavity; a first face having a first opening connected to the central cavity by a first conduit, and having a first part of an integrated fastening arrangement to enable an adaptor plate to be fastened over the first opening; a second face opposite the first face, having a second opening connected to the central cavity by a second conduit; and a side face extending between the first and second faces, wherein the side face has a side opening connected to the central cavity by a side conduit adapted to receive an electrical power cable or a cable duct to be housed within the preformed block between the first opening and the side opening, and wherein the side opening and the second opening extend to an edge of the block disposed between the side face and the second face, such that the side conduit and the second conduit, together with the central cavity, form a continuous cavity.

Also provided is a kit for housing and routing electrical power cables, comprising: the preformed block as described above, and an adaptor plate having a second part of an integrated fastening arrangement adapted to interact with the first part of the integrated fastening arrangement to enable the adaptor plate to be fastened to the first face of the preformed block. The adaptor plate preferably has a minimum dimension of 20 cm.

Within the scope of this disclosure, "preformed" means that the final block has been formed before it is set in the ground, i.e. it is not a block formed in situ by pouring a molten material or settable liquid such as wet concrete into a hole in the ground. Furthermore, it means that no further drilling is required to form the hollow block structure after it has set. The meaning of the term "block" is known to the skilled person in the construction industry and relates to a preformed, regular geometric shape, usually a cuboid and usually made from concrete, masonry or equivalent high-strength materials. It is preferable that the first and second faces are approximately parallel to allow the block to be set in the ground and provide a stable and level base for an electrical installation. The side face is typically perpendicular to the first and second faces. However, this is not essential. For example, a tapered block may also be contemplated.

The preformed block of the invention has a first opening on the first face, a second opening on the second face, and a side opening on a side face that are connected via conduits through a central cavity. The side opening and the second opening extend to an edge of the block disposed between the side face and the second face, such that the side conduit and the second conduit, together with the central cavity, form a continuous cavity. This provides a user-friendly means to install flexible underground cables or cable ducts, preferably electrical power cables, which are required to rise above ground level at a specific point. Thus, the preformed block provides an interface between the underground cables and an electrical installation to be mounted on top of the preformed block, i.e. on top of the first face, such as an electric vehicle charging unit. It enables the electrical installation to be installed without the need to allow wet concrete to dry, saving time and money. It does not require a further trench to be dug beneath the block for routing cables or cable ducts, and finally, it provides a high-quality base for the electrical installation.

The use of an adaptor plate as an interface between the block and the electric vehicle charging station allows for the correct arrangement of holes for the interface to be set, for example by drilling, on site immediately prior to installation, such that the preformed block is compatible with different connection interfaces, such as different connection interfaces associated with different vehicle charging stations.

As the adaptor plate is removable, the installer can also modify or replace the interface at a later date without altering, removing or damaging the preformed block, or install an array of electrical installations compatible with different interfaces using the same type of preformed block.

Use of a preformed block also allows for the position of the interface to the electrical installation, i.e. the first face of the block to be precisely fixed before filling the trench in which the underground cables or underground cable ducts have been laid, as the cables do not need to enter the preformed block from the bottom load-bearing face, i.e. the second face, as is the case for a standard CMU.

Inclusion of a side opening connected to the first opening in the preformed block allows cables to be passed into the preformed block after it has been laid on the ground in its final position on the second face. Inclusion of a continuous cavity between the second and side openings allows the block to be placed over prelaid cables or cable ducts. For example, typically the preformed block is laid over Type 1 MOT hard-core/stone, although it may instead be partially embedded in compacted sand, firm soil, or other suitable sub-bases, or it can be positioned on top of a previously prepared concrete slab.

Furthermore, the preformed block does not require the cables or cable ducts to be as deeply buried compared to a standard CMU. This saves time and cost of excavating the ground, and allows the cables to be laid on top of existing cable or piping networks.

The preformed block may be stabilised by partially fixing it in the ground before the cables or cable ducts are inserted, providing further stability to the preformed block and the final electrical installation. As such, the preformed block allows the electrical installation to be installed before the trench is filled.

The preformed block may comprise more than one side face with an opening connected to the central cavity by a respective conduit. This has the advantage that multiple cables can be fed through the same block and from different directions.

The preformed block may for example comprise a cuboid, so that there are six openings connected to the central cavity by respective conduits.

The preformed block may comprise a channel from the first face to the second face. This may be used as an integrated earth pit, through which an earth rod may be driven into the ground, thereby providing a local earth connection for the electrical installation.

The preformed block is preferably made from concrete, plastics, masonry or equivalent high-strength materials, more preferably from concrete or plastics, and most preferably concrete. These materials, especially concrete, have the ideal combination of durability, affordability and easy availability whilst being sufficiently lightweight to be installed by a mini-excavator or tele-handler. However, it will be appreciated by the skilled person that where the strength of the preformed block need not be as high then the preformed block can be cast from lightweight materials such as plastics. For example, where the electrical installation has a mass of 100 kg or less, or not all the weight of the installation is placed upon the preformed block in use, then a plastic preformed block may be envisaged.

Plastics may be formed by injection molding. Suitable plastics include acrylonitrile-butadiene-styrene (ABS), nylon, polycarbonate or polypropylene.

The preformed block preferably has a mass of less than 1,000 kg, preferably less than 400 kg. This mass limit ensures the preformed block is light enough to be installed by a standard excavator. Most preferably, the preformed block has a mass of less than 400 kg, which allows the preformed block to be installed by a standard mini-excavator that can be towed behind a standard van. As such, this mass range allows the preformed block to be installed without the need for specialist equipment.

The preformed block can be of any size suitable to provide a solid base for the required electrical installation, such as an electric vehicle charging units. However, the block should not be excessively bulky such that it becomes difficult to transport and install. Therefore, the preformed block preferably has a maximum dimension, i.e. the longest edge, of less than 150 cm, more preferably less than 60 cm.

The preformed block is for example for use in the installation of an electric vehicle charging station.

The invention also provides an electric vehicle charging station comprising: the preformed block of the invention; a plate fastened to the top face of the preformed block; and, a charging station coupled to the preformed block by a fastening arrangement formed into the plate.

The plate is designed to be adapted to the connection interface of the electrical vehicle charging unit on site. As such, the block is not limited to one type of electrical vehicle charging station manufacturer.

These and other aspects of the invention will be apparent from and elucidated with reference to the embodiments described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
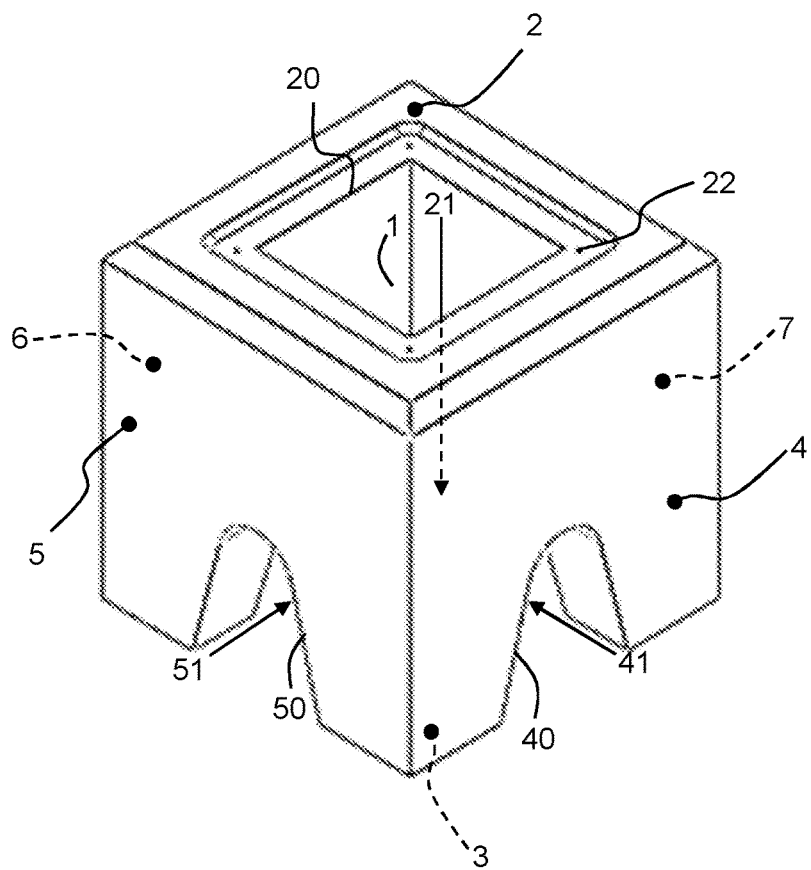
FIG. 1 depicts a 3-dimensional rendering of a preformed block for housing and routing electrical power cables according to the invention wherein the block is a cube, additionally depicting the central cavity, the first face, the first opening, the first conduit, two side faces, two side openings and two side conduits.

The invention will be described with reference to the drawings.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the figures are merely schematic and are not drawn to scale. It should also be understood that the same reference numerals are used throughout the figures to indicate the same or similar parts.

The invention provides a preformed block for housing and routing electrical power cables, comprising a central cavity. The top face and side faces comprise openings and conduits to the central cavity, such that electrical power cables or cable ducts can thus be routed within the block between those openings, from a side face (leading to a trench) to the top face (leading to an electrical installation on top). The second conduit and side conduits extend to the edge of the block disposed between the second face and side face, such that the block can be placed over prelaid cables or a prelaid cable ducts. The required connection to the electrical installation can then be routed through the first opening. This saves time compared with threading cables through the openings, especially if multiple electrical installations are to be laid in an array or in series.

There is also provided an electric vehicle charging station using the preformed block and an adaptor plate.

A first embodiment of the invention is shown in FIGS. 1 to 6, which show a preformed block for housing and routing electrical power cables and an adaptor plate.

In FIG. 1, the first face 2, and two side faces 4,5 are depicted. The first part of an integrated fastening arrangement 22 is shown on face 1. The first opening 20 and first conduit 21 are shown as are two side openings 40,50 and two side conduits 41,51. The central cavity 1 can also be seen. Unseen side faces 6,7 and the unseen second face 3 are shown using dashed pointers.

Figure 2:
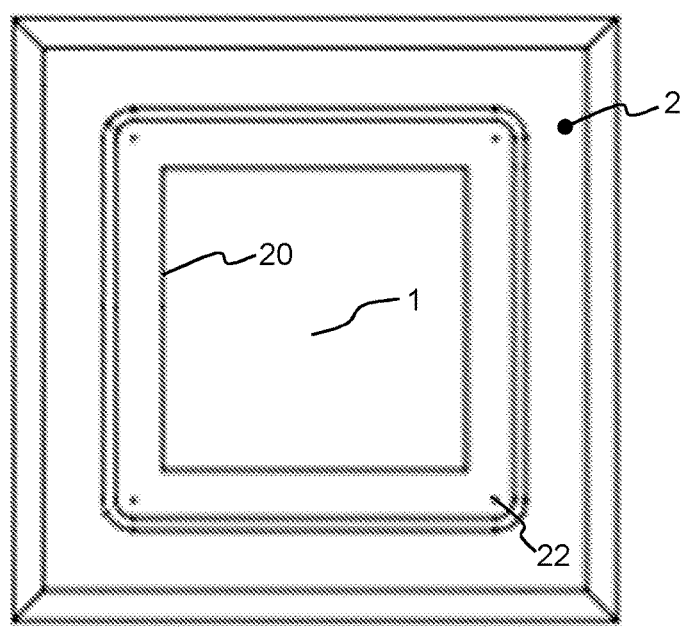
FIG. 2 depicts the same preformed block as FIG. 1, from above, looking at the first face, and additionally depicting the first opening and first part of an integrated fastening arrangement.

In FIG. 2 the preformed block is shown from above. The first face 2 is shown with the first part of an integrated fastening arrangement 22. The first opening 20 is depicted, along with the central cavity 1.

Figure 3:
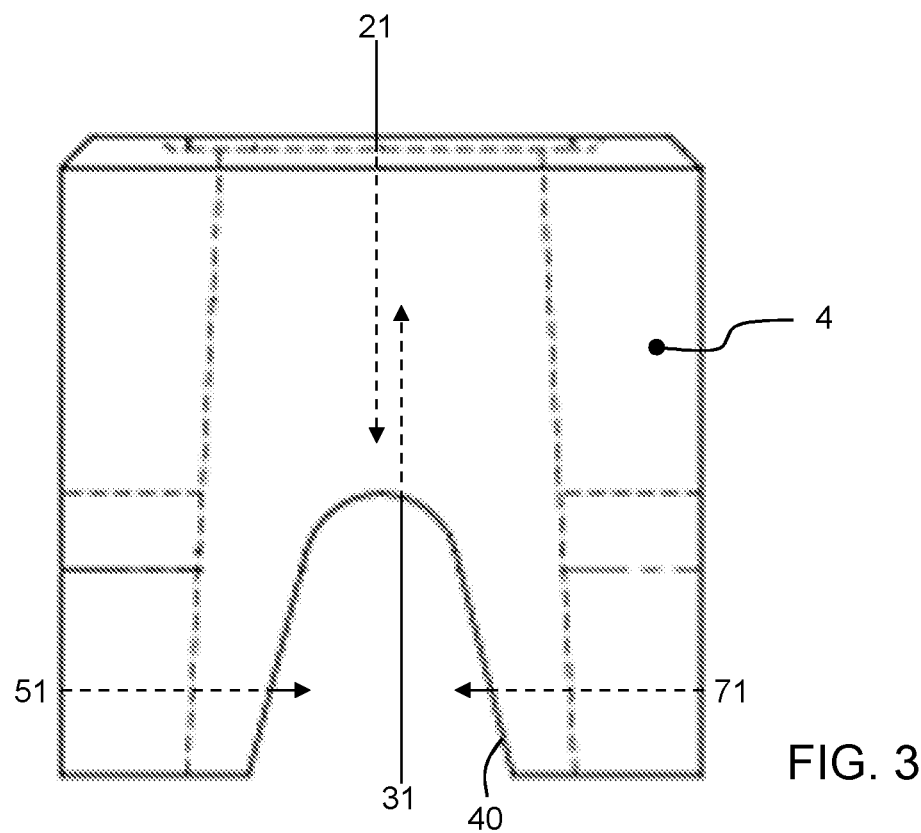
FIG. 3 depicts the same preformed block as FIGS. 1 and 2 rotated 90° around the horizontal axis from FIG. 2, additionally depicting a side face, a side opening, the first conduit and two side conduits.

In FIG. 3 the preformed block is shown from a side view, depicting a side face 4 and side opening 40. Also depicted are the first and second conduits 21,31 and two side conduits 51,71. Dashed lines represent unseen edges, sides, and side openings.

Figure 4:
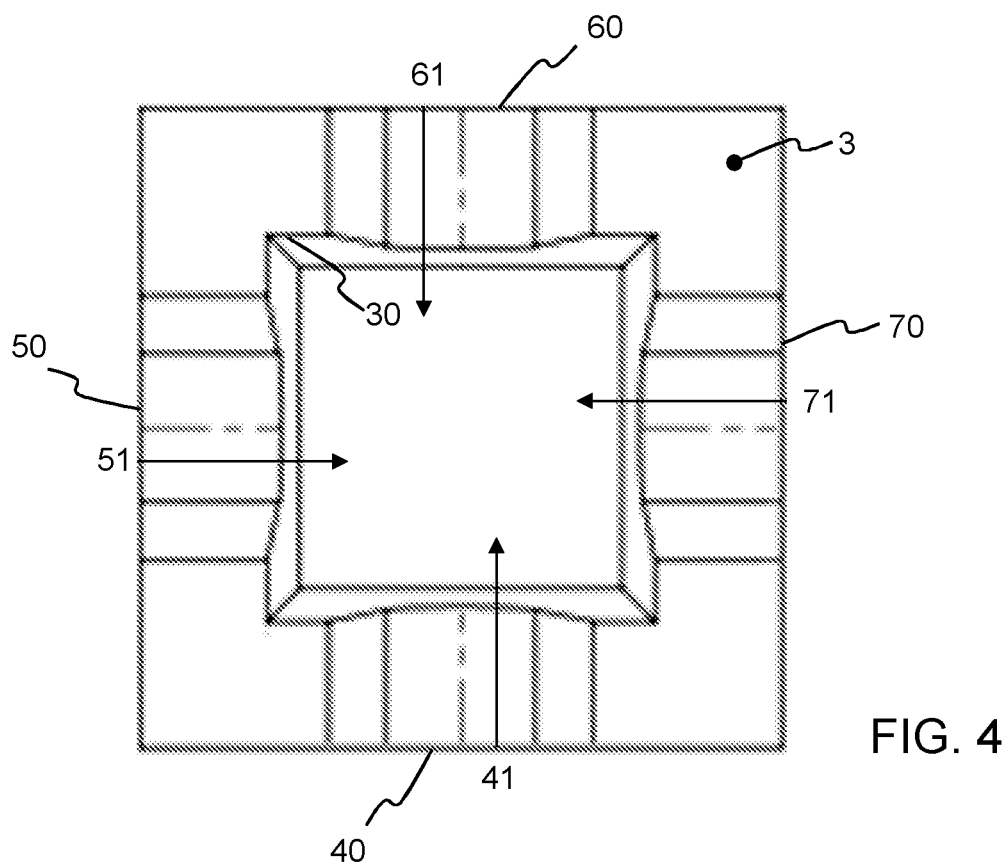
FIG. 4 depicts the same preformed block as FIG. 1-3 rotated a further 90° around the horizontal axis from FIG. 3 additionally depicting the second face, the second opening and four side conduits.
Figure 5:
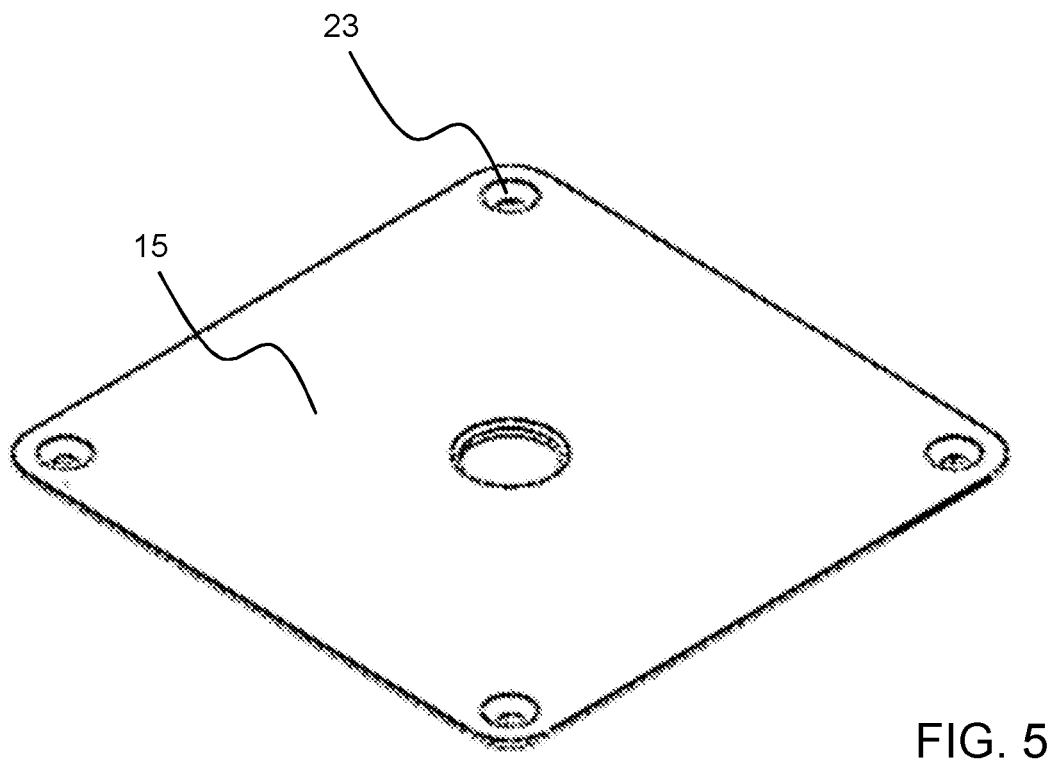
FIGS. 5 and 6 depict the adaptor plate according to the invention, additionally depicting a second part of an integrated fastening arrangement.
Figure 6:
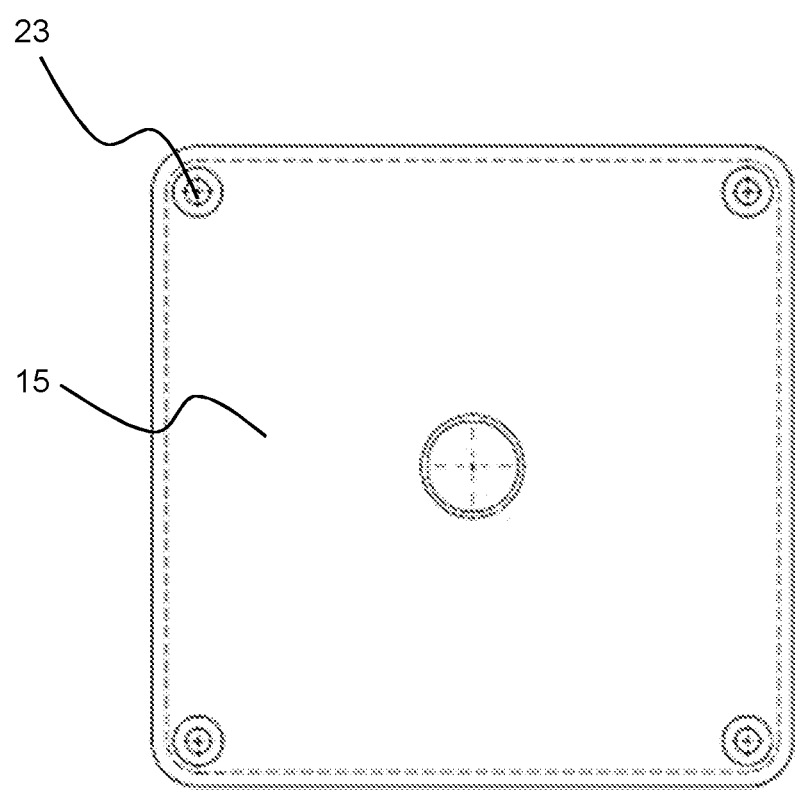

In FIG. 4 the preformed block is shown from below. The second face 3 and second opening 31 are depicted, along with four side openings 40,50,60,70 and four side conduits 41,51,61,71.

The block comprises a central cavity 1 (shown in FIG. 1) to which connections are made to openings in the faces of the block by internal conduits. The first face 2 is for example to function as a top face of the block, and an electrical installation such as a vehicle charging unit is to be mounted on that top face. The electrical installation is attached to the first face via the adaptor plate 15 shown in FIGS. 5 and 6. The first face 2 comprises a first square opening 20 connected to the central cavity by a conduit 21. A second face 3 is opposite the first face and has a square opening 30 connected to the central cavity by a conduit 31 (30,31 not shown in FIG.1, see FIGS. 4 and 3 respectively). The openings and conduits may have any desired cross sectional shape.

It will be appreciated that the preformed block can be almost any shape, but preferably the first and second faces are substantially parallel. Thus, it may be an upright prism with any cross sectional shape, for example a cylinder. In the preferred embodiments, the preformed block is a cuboid, preferably a cube. It may however be tapered, e.g. with a smaller area top than base. Thus, it has four side faces 4,5,6,7 perpendicular to the first and second faces. Each side face may have a respective side opening 40,50,60,70 connected to the central cavity by a respective conduit 41,51, 61,71. The side opening may have any desired shape. In a particularly preferred embodiment the block is a cuboid, preferably a cube, and each side face comprises one side opening. A cuboid shape provides structural stability, ease of manufacture and a regular shape that can be integrated into slab or block paving.

The side openings allow electrical power cables to be housed and routed within the block between the first (top) opening and one of the side openings.

The preformed block further comprises on its first face a first part of an integrated fastening arrangement 22. The adaptor plate comprises a second part of an integrated fastening arrangement 23. The first and second integrated fastening arrangements are adapted to be connected together. The integrated fastening arrangement is such that the adaptor plate may be attached securely to the block. In the example the first part of an integrated fastening arrangement may comprise a recessed internally threaded female fastener, for example internally threaded rods. The second part of an integrated fastening arrangement may consist of a hole, which is located to align with the first part of an integrated fastening arrangement such that a bolt may be passed through and secured in the recessed internally threaded female fastener. In another embodiment the first part of an integrated fastening system may comprise a bolt fixed in to the first face of the block. In this embodiment the second part of the integrated fastening arrangement is a hole in the plate with aligns with the bolt fixed into the first face of the block, such that the adaptor plate can be secured to the block with a bolt. In another embodiment the first and second parts of the integrated fastening arrangement are holes which align such that a fastening device may be passed through, such as a rivet.

Preferably, the first face is recessed, such that when the adaptor plate is attached, they present a flush surface on which to base an electrical installation, for example an electric vehicle charging station The adaptor plate is made of a material, for example metal, suitable for altering with an arrangement of holes, for example by drilling. As such, the plate can be drilled to correspond with the required arrangement of holes for cabling and fasteners for any electrical installation, for example an electric vehicle charging station. The adaptor plate may be altered by the installer immediately prior to installation or may be prepared in advance with any required arrangement of holes. This makes the invention more versatile, in that it is compatible with different fastening interface arrangements.

The adaptor plate is separate from the preformed block, such that it can be removed and replaced with a new adaptor plate, allowing installation of a different electrical installation without changing the preformed block. Removal of the adaptor plate also allows for the inspection of cables beneath the surface.

As a minimum, the block may have only two openings, a top opening and a side opening. It thus enables a 90-degree bend in the power cable path from a horizontal trench to a vertical orientation up into the electrical installation above. However, the inclusion of side openings in four side faces has the advantage that different cable routing paths may be followed, for example between multiple installations in a line or array.

There may be different designs of preformed block of different sizes, for different weights of installation. Examples of possible dimensions are (L×W×H) 400 mm×400 mm×450 mm, 500 mm×500 mm×500 mm, 500 mm×500 mm×600 mm, 600 mm×600 mm×450 mm, 600 mm×600 mm×600 mm, 800 mm×500 mm×450 mm, 800 mm×500 mm×500 mm, 800 mm×500 mm×600 mm, 1500 mm×1500 mm×600 mm. Preferably, the block has dimensions (L×W×H) in the range 400 to 1500 mm×400 to 1500 mm×450 to 600 mm Thus, it can be seen that the block may typically be a cuboid. In a preferred embodiment, the block is a cube. Most preferably the block is a cube with dimensions (L×W×H) 500 mm×500 mm×500 mm. The depth (i.e. the distance between the first and second faces) is for example in the range 30 to 150 cm, particularly about 50 cm, to give the optimum balance of compact size and strength.

These dimensions are in particular for use in installing an electric vehicle charging station whilst ensuring the weight is minimised. The block is made of concrete and preferably weighs less than 400 kg, which allows the preformed block to be installed by a standard mini-excavator that can be towed behind a standard van. As such, the preformed block may be installed without the need for specialist equipment.

The first opening and first conduit may be any shape. In the example the first opening and first conduit are square. The first opening and first conduit must have a minimum dimension of 10 cm, such that a person may pass their hand through the first opening into the central cavity. By "minimum dimension" is meant that whatever the shape, it encompasses a circle of diameter 10 cm. In one embodiment the first opening and first conduit may be a rectangle. In another embodiment the first opening and first conduit may be an ellipse, wherein the maximum and minimum diameters must have a minimum value of 10 cm. The minimum dimensions have the advantage of enabling the user to pull prelaid cables from underneath the block up to the central cavity, where they may be connected with cables form an electrical installation, for example an electric vehicle charging station.

The adaptor plate may be any shape. Preferably it is the same shape as the first opening. The adaptor plate must be larger than the first opening, such that it covers the first conduit and allows overlap for connection to the first face. The adaptor plate has a minimum dimension (as defined hereinabove) of 20 cm.

Preferably, there is an open channel from the first opening, through to the second opening. This enables an earth rod to be hammered into the ground through the channel. A local earth electrical connection can then be made to the earth rod from the electrical installation. Thus, the connection to the earth rod is internal to the block.

The side openings are for example 15 to 25 cm wide at the base of the block. Preferably the side openings are 21 cm wide at the base of the block. The side openings have a height in the range of 20 to 28 cm. Preferably the side openings have a height of 24 cm. In one embodiment the side openings form an arch shape. An arch shape can be formed by two straight sides topped by an arc. In another embodiment, the whole side opening forms an arc. The arc may be a semicircle. In another embodiment the arc is segmental. In a further embodiment the arc is elliptical. In a further embodiment the arc is three-centred. In a further embodiment the arc is parabolic. In a preferred embodiment the side opening is wider at its base than at its top, such that the edges are not vertical but sloped. In a most preferred embodiment the side opening forms a semi-circle arch-shape, is 21 cm wide at the base of the block, has a height of 24 cm and has a 6 cm radius semi-circle.

Any shape of side opening may be contemplated. An arch shape with sloping edges is preferable as it enables the opening to engage with a cable duct having different diameters, such as a two- to twelve-inch diameter cable duct, preferably four- to six-inch diameter cable duct, most preferably two-, four-, six- or twelve-inch cable duct. In the context of the invention, "engage" means to hold in place by way of friction.

In one embodiment the block is made of plastics. In the preferred embodiment the block is made from concrete. Other similar high-strength materials can be considered.

These materials, especially concrete, have the ideal combination of durability, affordability and easy availability whilst being sufficiently lightweight to be installed by a mini-excavator. In particular the preformed block can be prepared in the method of manufacturing a block described below.

The method comprises filling a block-shaped mould defining the features of the invention with a molten material or settable liquid. In one embodiment the molten liquid is molten plastics. In another embodiment the settable liquid is wet concrete.

The molten material or settable liquid is then allowed to solidify to form the precast block.

The block is then removed from the mould. The mould may be a two-part mould, wherein the two halves of the mould can be separated to liberate the preformed block.

This manufacturing process is by way of example only. The skilled person will realise that this is just one possible way of manufacturing the precast block, and that other suitable manufacturing processes exist and can easily be put into practise.

The preformed block shown in FIGS. 1 to 6 can be used for the installation of an electric vehicle charging station by digging a hole or trench in the ground and laying a sub-base such as compacted sand, firm soil, MOT type 1 hardcore, concrete or other suitable sub-base. The preformed block can then be set on the sub-base on the second face with the first face facing up.

The underground cable or underground cable duct can then be routed and housed through the preformed block to the electrical installation, for example electrical vehicle charging unit, or set over a prelaid cable or a prelaid cable duct, and the required cable routed up through the first opening after the block has be set in place. Electrical connection to the cable is made in the main housing of the charging unit. An earth rod may be placed in the ground through the first and second openings 21,31 and central cavity 1 and electrically coupled to an earth connection of the charging station.

The first opening can then be covered with an adaptor plate drilled with an arrangement of holes suitable for fastening to an electrical installation, such as an electric vehicle charging station. Mechanical connection is made by connection between a connection interface of the charging unit and the adaptor plate. The hole or trench can then be filled with an appropriate building material. The electrical vehicle charging station can be used to charge electric vehicles.

If more than one different type of charging station is to be installed in an array, then the same preformed block can be placed in the ground and adaptor plates individually altered for each required fastening arrangement can be prepared. The same underground cable can then be routed and housed through the array of preformed blocks.

Figure 7:
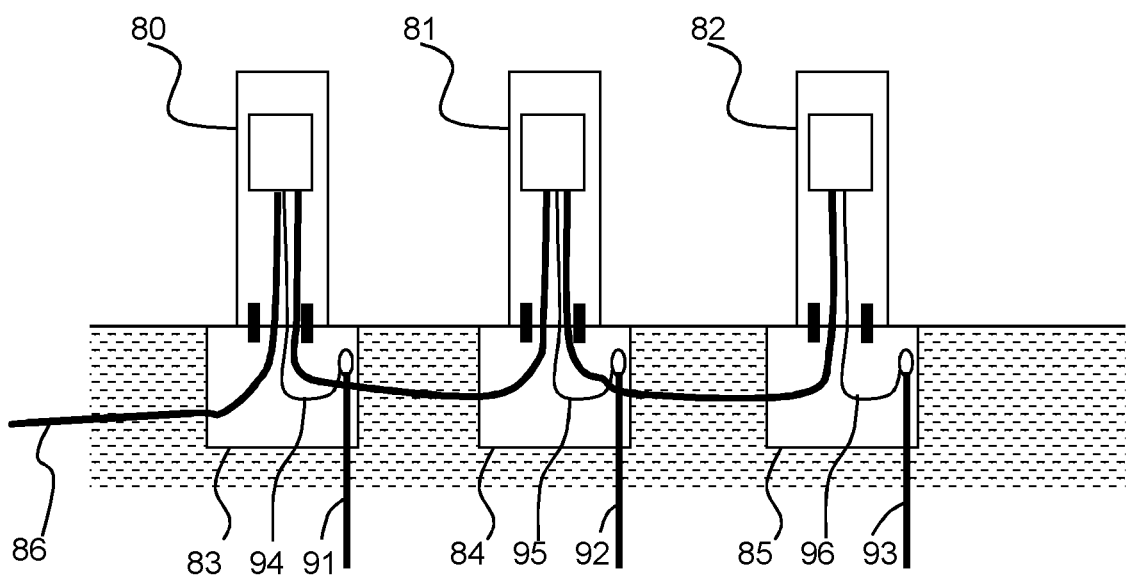
FIG. 7 shows a line of three electric vehicle charging stations each mounted over a precast block.

FIG. 7 shows a line of three charging units 80,81,82 each mounted over a precast block 83,84,85 as described above. A power cable 86 connects to each charging station, forming a daisy chain connection. A ground rod 91,92,93 is also shown for each charging station, and an earth connection 94,95,96 connects locally to each ground rod from the charging station, through the precast block. The fastening arrangements are shown schematically. Depending on the modifications to the adaptor plate, each charging unit may be the same or different.

As explained above, the invention is of particular interest for electric vehicle charging stations. The details of such charging stations are well known to those skilled in the art and do not form part of the invention.

It will be appreciated by the skilled person that the preformed block of the current invention can be used to house any electrical power cable and is compatible not only with electric vehicle charging stations, but also any other street furniture.

The electric vehicle charging unit is typically an upright cabinet or post. However, the invention may also be applied to a low-lying design, such that an electric vehicle can be driven over the top. The block then needs to retain a vehicle weight when placed directly on it.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. Any reference signs in the claims should not be construed as limiting the scope.

What is claimed is:

1. A preformed block for housing and routing electrical power cables, comprising:
   a central cavity (1);
   a first face (2) having a first opening (20) connected to the central cavity by a first conduit (21), and having a first part of an integrated fastening arrangement (22) to enable an adaptor plate to be fastened over the first opening;
   a second face (3) opposite the first face, having a second opening (30) connected to the central cavity by a second conduit (31); and
   a side face (4,5,6,7) extending between the first and second faces,
   wherein the side face has a side opening (40,50,60,70) connected to the central cavity by a side conduit (41,51,61,71) adapted to receive an electrical power cable or a cable duct to be housed within the preformed block between the first opening and the side opening, and
   wherein the side opening and the second opening extend to an edge of the preformed block disposed between the side face and the second face, such that the side conduit and the second conduit, together with the central cavity, form a continuous cavity, and wherein the first opening and the first conduit each have a minimum dimension of 10 cm.

2. The preformed block according to claim 1, wherein the first face is recessed to provide a flush surface when an adaptor plate is attached.

3. The preformed block according to claim 1, wherein the first part of the integrated fastening arrangement comprises a recessed female connector.

4. The preformed block according to claim 1, wherein the preformed block has a plurality of side faces (4,5,6,7), each having a side opening connected to the central cavity by a side conduit.

5. The preformed block according to claim 1, wherein the side opening forms an arch-shape in the side face adapted such that the side opening is able to engage with a cable duct having different diameters.

6. The preformed block according to claim 5, wherein the arch-shape is suitable to engage with a two-to twelve-inch diameter cable duct.

7. The preformed block according to claim 1, wherein the preformed block is preformed from concrete or plastics.

8. The preformed block according to claim 1, wherein the preformed block has a mass of less than 1,000 kg.

9. The preformed block according to claim 8, wherein the preformed block has a mass of less than 400 kg.

10. The preformed block according to claim 1, wherein the preformed block has a maximum dimension of less than 150 cm.

11. The preformed block according to claim 10, wherein the preformed block has a maximum dimension of less than 60 cm.

12. An electric vehicle charging station installation comprising:
    (a) a charging station;
    (b) the preformed block according to claim 1;
    (c) an adaptor plate fastened to the top face of the preformed block, adapted to enable fastening to the charging station.

13. The kit according to claim 11, wherein the first face is recessed to provide a flush surface when an adaptor plate is attached.

14. The kit according to claim 11, wherein the first part of the integrated fastening arrangement comprises a recessed female connector.

15. The kit according to claim 11, wherein the preformed block has a plurality of side faces (4,5,6,7), each having a side opening connected to the central cavity by a side conduit.

16. The kit according to claim 11, wherein the side opening forms an arch-shape in the side face adapted such that the side opening is able to engage with a cable duct having different diameters.

17. The kit according to claim 16, wherein the arch-shape is suitable to engage with a two-to twelve-inch diameter cable duct.

18. The kit according to claim 11, wherein the preformed block is preformed from concrete or plastics.

19. The kit according to claim 11, wherein the preformed block has a mass of less than 400 kg.

20. The kit according to claim 11, wherein the preformed block has a maximum dimension of less than 60 cm.

21. A kit for housing and routing electrical power cables, comprising:
   (a) a preformed block for housing and routing electrical power cables, comprising:
      a central cavity (1);
      a first face (2) having a first opening (20) connected to the central cavity by a first conduit (21), and having a first part of an integrated fastening arrangement (22) to enable an adaptor plate to be fastened over the first opening;
      a second face (3) opposite the first face, having a second opening (30) connected to the central cavity by a second conduit (31); and
      a side face (4,5,6,7) extending between the first and second faces,
      wherein the side face has a side opening (40,50,60,70) connected to the central cavity by a side conduit (41,51,61,71) adapted to receive an electrical power cable or a cable duct to be housed within the preformed block between the first opening and the side opening, and
      wherein the side opening and the second opening extend to an edge of the preformed block disposed between the side face and the second face, such that the side conduit and the second conduit, together with the central cavity, form a continuous cavity; and
   (b) an adaptor plate having a second part of an integrated fastening arrangement (23) adapted to interact with the first part of the integrated fastening arrangement to enable the adaptor plate to be fastened to the first face of the preformed block, and wherein the adaptor plate has a minimum dimension of 20 cm.

22. A method for installing an electrical installation comprising using the preformed block according to claim 1.

23. The method of claim 22, for installing an electric vehicle charging station installation.

24. A method for installing an electrical installation comprising using the kit according to claim 21.

25. A preformed block for housing and routing electrical power cables, comprising:
   a central cavity (1);
   a first face (2) having a first opening (20) connected to the central cavity by a first conduit (21), and having a first part of an integrated fastening arrangement (22) to enable an adaptor plate to be fastened over the first opening;
   a second face (3) opposite the first face, having a second opening (30) connected to the central cavity by a second conduit (31); and
   a side face (4,5,6,7) extending between the first and second faces,
   wherein the side face has a side opening (40,50,60,70) connected to the central cavity by a side conduit (41,51,61,71) adapted to receive an electrical power cable or a cable duct to be housed within the preformed block between the first opening and the side opening, and
   wherein the side opening and the second opening extend to an edge of the preformed block disposed between the side face and the second face, such that the side conduit and the second conduit, together with the central cavity, form a continuous cavity, wherein the preformed block has a mass of less than 1,000 kg.

26. The preformed block according to claim 25, wherein the first face is recessed to provide a flush surface when an adaptor plate is attached.

27. The preformed block according to claim 25, wherein the first part of the integrated fastening arrangement comprises a recessed female connector.

28. The preformed block according to claim 25, wherein the preformed block has a plurality of side faces (4,5,6,7), each having a side opening connected to the central cavity by a side conduit.

29. The preformed block according to claim 25, wherein the side opening forms an arch-shape in the side face adapted such that the side opening is able to engage with a cable duct having different diameters.

30. The preformed block according to claim 29, wherein the arch-shape is suitable to engage with a two-to twelve-inch diameter cable duct.

31. The preformed block according to claim 25, wherein the preformed block is preformed from concrete or plastics.

32. The preformed block according to claim 25, wherein the preformed block has a mass of less than 400 kg.

33. The preformed block according to claim 25, wherein the preformed block has a maximum dimension of less than 150 cm.

34. The preformed block according to claim 33, wherein the preformed block has a maximum dimension of less than 60 cm.

35. The preformed block according to claim 25, wherein the first opening and the first conduit each have a minimum dimension of 10 cm.

36. A kit for housing and routing electrical power cables, comprising:
   (a) the preformed block according to claim 25; and
   (b) an adaptor plate having a second part of an integrated fastening arrangement (23) adapted to interact with the first part of the integrated fastening arrangement to enable the adaptor plate to be fastened to the first face of the preformed block.

37. The kit according to claim 36, wherein the adaptor plate has a minimum dimension of 20 cm.

38. A method for installing an electrical installation comprising using the kit according to claim 36.

39. A method for installing an electrical installation comprising using the preformed block according to claim 25.

40. The method of claim 39, for installing an electric vehicle charging station installation.

41. An electric vehicle charging station installation comprising:
(a) a charging station;
(b) the preformed block according to claim 25;
(c) an adaptor plate fastened to the top face of the preformed block, adapted to enable fastening to the charging station.

42. A preformed block for housing and routing electrical power cables, comprising:
a central cavity (1);
a first face (2) having a first opening (20) connected to the central cavity by a first conduit (21), and having a first part of an integrated fastening arrangement (22) to enable an adaptor plate to be fastened over the first opening;
a second face (3) opposite the first face, having a second opening (30) connected to the central cavity by a second conduit (31); and
a side face (4,5,6,7) extending between the first and second faces,
wherein the side face has a side opening (40,50,60,70) connected to the central cavity by a side conduit (41,51,61,71) adapted to receive an electrical power cable or a cable duct to be housed within the preformed block between the first opening and the side opening, and
wherein the side opening and the second opening extend to an edge of the preformed block disposed between the side face and the second face, such that the side conduit and the second conduit, together with the central cavity, form a continuous cavity, wherein the preformed block for has a maximum dimension of less than 150 cm.

43. The preformed block according to claim 42, wherein the first face is recessed to provide a flush surface when an adaptor plate is attached.

44. The preformed block according to claim 42, wherein the first part of the integrated fastening arrangement comprises a recessed female connector.

45. The preformed block according to claim 42, wherein the preformed block has a plurality of side faces (4,5,6,7), each having a side opening connected to the central cavity by a side conduit.

46. The preformed block according to claim 42, wherein the side opening forms an arch-shape in the side face adapted such that the side opening is able to engage with a cable duct having different diameters.

47. The preformed block according to claim 46, wherein the arch-shape is suitable to engage with a two-to twelve-inch diameter cable duct.

48. The preformed block according to claim 42, wherein the preformed block is preformed from concrete or plastics.

49. The preformed block according to claim 42, wherein the preformed block has a mass of less than 1000 kg.

50. The preformed block according to claim 42, wherein the preformed block has a mass of less than 400 kg.

51. The preformed block according to claim 42, wherein the preformed block has a maximum dimension of less than 60 cm.

52. The preformed block according to claim 42, wherein the first opening and the first conduit each have a minimum dimension of 10 cm.

53. A kit for housing and routing electrical power cables, comprising:
(a) the preformed block according to claim 42; and
(b) an adaptor plate having a second part of an integrated fastening arrangement (23) adapted to interact with the first part of the integrated fastening arrangement to enable the adaptor plate to be fastened to the first face of the preformed block.

54. The kit according to claim 53, wherein the adaptor plate has a minimum dimension of 20 cm.

55. A method for installing an electrical installation comprising using the kit according to claim 53.

56. A method for installing an electrical installation comprising using the preformed block according to claim 42.

57. The method of claim 56, for installing an electric vehicle charging station installation.

58. An electric vehicle charging station installation comprising:
(a) a charging station;
(b) the preformed block according to claim 42;
(c) an adaptor plate fastened to the top face of the preformed block, adapted to enable fastening to the charging station.

* * * * *